United States Patent
Blaine et al.

(10) Patent No.: US 10,303,151 B2
(45) Date of Patent: *May 28, 2019

(54) METHOD AND SYSTEM FOR PORTIONING WORKPIECES USING REFERENCE SHAPE AS A DIRECTLY CONTROLLED CHARACTERISTIC

(71) Applicant: John Bean Technologies Corporation, Chicago, IL (US)

(72) Inventors: George R. Blaine, Lake Stevens, WA (US); David A. Below, Port Clinton, OH (US); Arthur W. Vogeley, Jr., Seattle, WA (US)

(73) Assignee: John Bean Technologies Corporation, Chicago, IL (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/875,974

(22) Filed: Jan. 19, 2018

(65) Prior Publication Data

US 2018/0143607 A1    May 24, 2018

Related U.S. Application Data

(60) Continuation of application No. 14/685,443, filed on Apr. 13, 2015, now abandoned, which is a
(Continued)

(51) Int. Cl.
*G05B 19/18* (2006.01)
*A22C 17/00* (2006.01)
(Continued)

(52) U.S. Cl.
CPC ........ *G05B 19/188* (2013.01); *A22C 17/0073* (2013.01); *A22C 17/0086* (2013.01);
(Continued)

(58) Field of Classification Search
None
See application file for complete search history.

(56) References Cited

U.S. PATENT DOCUMENTS

| 3,800,650 A | 4/1974 | Schroder |
|---|---|---|
| 4,962,568 A | 10/1990 | Rudy |

(Continued)

FOREIGN PATENT DOCUMENTS

| GB | 2 364 894 A | 2/2002 |
|---|---|---|
| NZ | 228432 A | 5/1991 |
| WO | 02/07937 A2 | 1/2002 |

*Primary Examiner* — Dennis M Butler
(74) *Attorney, Agent, or Firm* — Christensen O'Connor Johnson Kindness PLLC

(57) ABSTRACT

A method and system are provided for automatically portioning workpieces, such as food products, by simulating portioning the workpieces in accordance with the one or more desired shapes of the final piece(s) as a directly controlled physical characteristic (parameter/specification) as well as one or more resulting indirectly controlled physical characteristics (parameters/specifications). The desired shape(s) of the final piece(s) are defined by a plurality of manipulatable reference coordinates. A workpiece is scanned to obtain scanning information, then portioning of the workpiece is simulated in accordance with the desired shape(s) of the final piece(s) defined by the directly controlled reference coordinates, thereby to determine the one or more indirectly controlled physical characteristics of the one or more final pieces to be portioned from the workpiece. The simulated portioning of the workpiece is performed for multiple combinations of directly controlled shapes as defined by the modified or edited reference coordinates and indirectly controlled physical characteristics until an acceptable set of a directly controlled shape and resulting one or more indirectly controlled physical characteristics is determined.

22 Claims, 11 Drawing Sheets

Related U.S. Application Data continuation of application No. 13/571,298, filed on Aug. 9, 2012, now Pat. No. 9,008,824, which is a continuation-in-part of application No. 13/358,423, filed on Jan. 25, 2012, now Pat. No. 9,128,810, which is a continuation-in-part of application No. 13/013,771, filed on Jan. 25, 2011, now Pat. No. 8,688,259, which is a continuation-in-part of application No. 12/369,687, filed on Feb. 11, 2009, now Pat. No. 8,412,366, which is a division of application No. 11/030,622, filed on Jan. 5, 2005, now Pat. No. 7,593,785, application No. 15/875,974, which is a continuation of application No. 12/369,674, filed on Feb. 11, 2009, now Pat. No. 9,675,090.

(60) Provisional application No. 60/535,354, filed on Jan. 9, 2004.

(51) Int. Cl.
*B26D 5/00* (2006.01)
*B26D 7/30* (2006.01)

(52) U.S. Cl.
CPC ............... *B26D 5/00* (2013.01); *B26D 5/005* (2013.01); *B26D 5/007* (2013.01); *B26D 7/30* (2013.01); *B26D 2005/002* (2013.01); *B26D 2210/02* (2013.01); *G05B 2219/45044* (2013.01); *G05B 2219/45111* (2013.01)

(56) References Cited

U.S. PATENT DOCUMENTS

| | | |
|---|---|---|
| 5,076,124 A | 12/1991 | Whitehouse |
| 5,163,865 A | 11/1992 | Smith |
| 5,937,080 A | 8/1999 | Vogeley, Jr. |
| 6,164,174 A | 12/2000 | Sigurdsson |
| 6,612,920 B1 | 9/2003 | Young |
| 6,974,373 B2 | 12/2005 | Kriesel |
| 6,983,678 B2 | 1/2006 | Wattles |
| 7,007,595 B2 | 3/2006 | Ozery |
| 7,593,785 B2 | 9/2009 | Blaine |
| 8,412,366 B2 | 4/2013 | Blaine |
| 9,675,090 B2 * | 6/2017 | Blaine ................. A22C 17/0086 |
| 2002/0034571 A1 | 3/2002 | Zimmerman |
| 2003/0130758 A1 * | 7/2003 | Hirano ............... G05B 19/4097 700/182 |
| 2003/0145699 A1 * | 8/2003 | Kim ......................... B26D 3/10 83/13 |

* cited by examiner

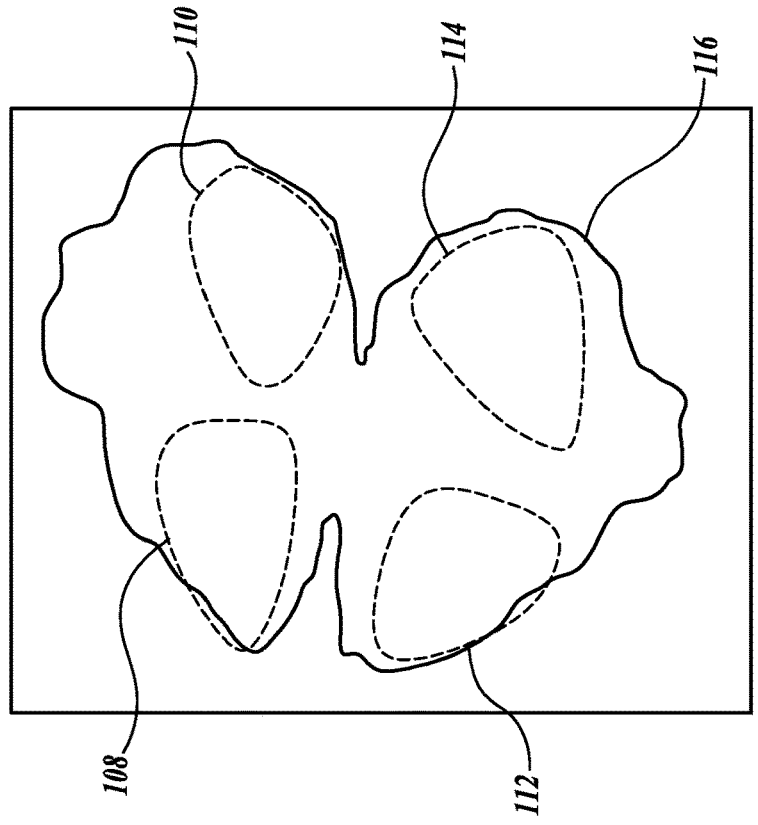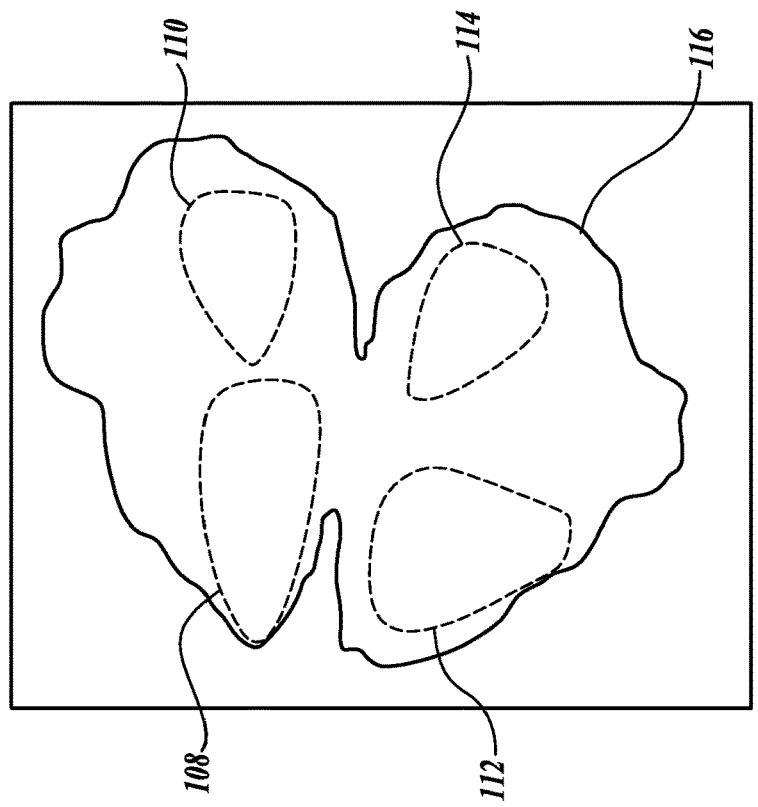

METHOD AND SYSTEM FOR PORTIONING WORKPIECES USING REFERENCE SHAPE AS A DIRECTLY CONTROLLED CHARACTERISTIC

FIELD OF THE INVENTION

The present invention relates generally to processing workpieces such as food products, and more specifically, to portioning workpieces into pieces, while also considering the desired shape of the portioned pieces as a directly controlled characteristic.

BACKGROUND OF THE INVENTION

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion the chicken breast to the weights desired by the customer, with no or limited amount of fat, so as to use the chicken breast most effectively.

Portioning and/or trimming of the workpiece can be carried out by various cutting devices, including high-speed liquid jet cutters (liquids may include, for example, water or liquid nitrogen) or rotary or reciprocating blades, after the food product is transferred from the infeed to a cutting conveyor. Once the portioning/trimming has occurred, the resulting portions are off-loaded from the cutting conveyor and placed on a take-away conveyor for further processing or, perhaps, to be placed in a storage bin.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical parameters, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources.

The data and information measured/gathered by the scanning devices are transmitted to a computer, typically on board the portioning apparatus, which records the location of the workpiece on the conveyor as well as the shape and other parameters of the workpiece. With this information, the computer determines how to optimally cut or portion the workpiece at the portioning station, and the portioning may be carried out by various types of cutting/portioning devices.

Automatic portioning systems of food products, such as boneless chicken breasts, should be capable of cutting the products into uniform shape, weight, and other parameters as provided by their users. Oftentimes, the users have finished samples that exemplify the users' particular needs, such as a sample having a desired shape.

Some conventional portioning systems use fixed forms to portion products into a specific shape. A form is like a cookie cutter that is used to stamp out a particular shape, and then the cut piece is trimmed to a desired thickness by various types of knives or other devices. The use of fixed forms is cumbersome, in that each form is usable to produce only one shape, and thus many forms are required for producing various shapes. Also, each form "stamps out" pieces only to a particular shape, without considering, for example, the resulting weight. Hand cutting is also available for portioning food products into particular shapes, but hand cutting the products into both uniform shape and uniform weight is very difficult.

Accordingly, a need exists for an improved portioning system, which is capable of cutting workpieces to a specific shape, and of growing, shrinking, or otherwise altering the shape in order to achieve one or more additional dependently related parameters such as weight. Preferably, such a portioning system permits a user to readily define the particular shape, and other dependently related parameters, to which workpieces are to be portioned.

The general problem of workpiece portioning, and in particular food workpiece portioning, is to fit acceptable or desired portions into highly variable workpieces and then cut them and at the same time utilize as much of the food workpieces as possible. The workpieces to be processed, including food workpieces, vary in every dimension, have random defects, and have areas of fat and cartilage that must be avoided. The thickness varies throughout each workpiece in addition to the average thickness varying from workpiece to workpiece.

Processors of the workpieces, for example meat workpieces, expect the portions to be of a narrow weight range, to maximize the number of portions they can sell without dissatisfying anyone. Their customers expect the meat portions to be of a specific shape or close enough to it with a fairly narrow thickness range so that standardized processing can occur, such as a cooking process that will yield uniformly cooked meat. If the meat is to be placed in a bun, it is expected that the plan-view area of the meat portion should be compatible with the bun rather than disappearing inside or hanging over the bun excessively. Also, it is undesirable that large pieces of fat or cartilage or bone exist in a portion. Further, tears, holes, and other defects are unattractive in a portion as well. In addition, it is expected that the waste resulting from the portioning process is minimized.

These issues are sought to be addressed by the methods and systems discussed below.

SUMMARY OF THE INVENTION

According to a further aspect of the present invention, the step of simulating portioning of the workpiece according to the shape of the desired final piece(s) as a directly controlled physical characteristic and calculating the one or more resulting indirectly controlled characteristics of the one or more final pieces to be portioned is repeated for multiple combinations of the one or more directly controlled shape characteristics. Each such combination is rated based on how closely the combination achieves the desired one or more directly controlled shape characteristics and/or the one or more indirectly controlled characteristics. In this regard, one or more algorithms are used to select potentially acceptable one or more directly controlled shape characteristics until an acceptable level of one or more directly controlled shape characteristics and one or more indirectly controlled characteristics are determined.

In another aspect of the present invention, each combination is rated according to an optimization function as applied to one or more of the one or more directly controlled shape characteristics and one or more indirectly controlled characteristics, with the optimization function rating of the one or more directly controlled shape characteristics and one or more indirectly controlled characteristics related to the deviation of the one or more directly controlled shape characteristics and one or more indirectly controlled characteristics from an ideal characteristic level or range.

In a further aspect of the present invention, a weighting factor can be imposed on the one or more directly controlled shape characteristics as well as the one or more indirectly controlled characteristics.

According to a still further aspect, the present invention permits a user to define a desired (reference) shape(s) into which the workpieces are to be portioned, by identifying a plurality of reference coordinates of the desired reference shape(s). Further, the user is allowed to edit the positions of some or all of the reference coordinates to define a refined or modified shape(s) template to be used in further processing. To this end, the user can interrupt the normal operation of the automatic portioning system at any time to edit the desired shape(s). The desired shape is stored in computer memory and subsequently used to control the downstream cutting/portioning equipment of the portioning system to cut the workpieces into the desired shape. Alternatively, the reference shape(s) or modified shape is automatically edited by the optimization function being used. Simultaneously with the editing of the reference shape or the modified shape, the optimization function is capable of moving the reference/modified shape(s) about the workpiece to achieve a best fit of the reference/modified shape(s) on the workpiece. The end result is achieving final pieces of desired shape and other desired directly controlled physical characteristics of the final pieces, as well as desired indirectly controlled physical characteristics of the final pieces.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 9A through 9F illustrate several of the hundreds of iterations that a cost minimization algorithm performs in a very short time span in seeking a best fit of final pieces defined by reference points on a work piece.

DETAILED DESCRIPTION OF THE EXEMPLARY EMBODIMENTS

With respect to the terminology used in the present application, for the most part, the word "parameter" is used to refer to a physical characteristic or feature such as length, width, thickness, weight or color. Also for the most part, the word "specification" refers to a particular parameter value or range, such as a length of between 110 and 120 mm, a weight that is no more than 30 grams, or the color blue. Also, in accordance with the present application, a specific instance of a parameter will have a value; the value may or may not lie within a particular specification. In spite of the foregoing, it is within the scope of the present application to intermingle the use of the word "parameter" with the use of the word "specification." For example, if the word "specification" is being utilized, this word should be interpreted broadly enough to also encompass the word "parameter," and vice-versa. Also, in the present application, the word "characteristic" shall be a generic term that refers to "parameter" and/or "specification."

Also, as is apparent in the present application, the term "portion" (as derived from a workpiece) has the same meaning as the terms "piece" or "final piece" or "portioned piece."

Figure 1:
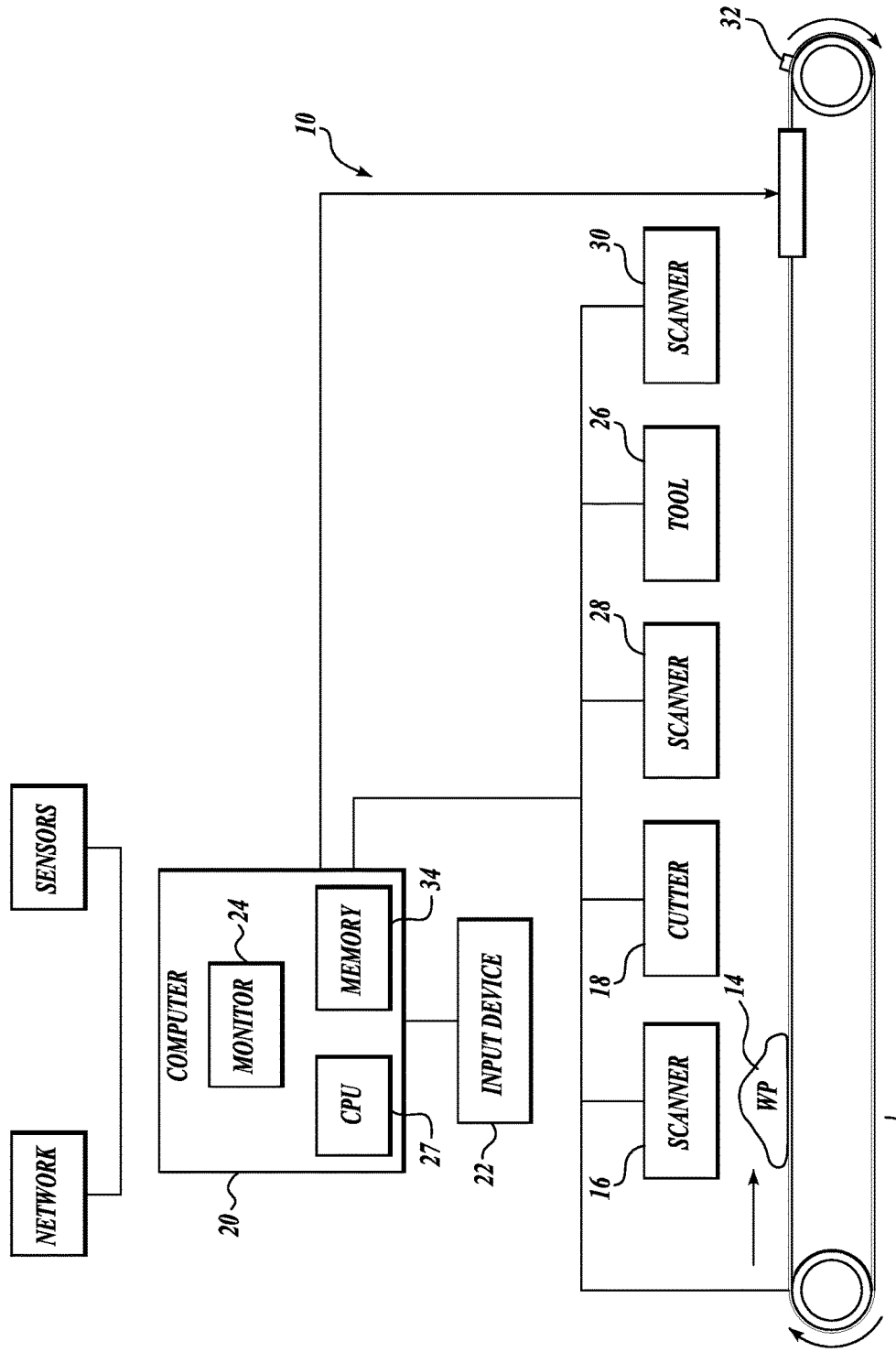
FIG. 1 illustrates a system suitable for use in performing a method of the present invention.

FIG. 1 schematically illustrates a system 10 suitable for implementing one embodiment of the present invention. The system 10 includes a conveyor 12 for carrying a workpiece 14 or "WP" to be portioned thereon, a scanner 16 for scanning the workpiece 14, and a cutter 18 for portioning the workpiece 14 into one or more pieces. Although a singular conveyor 12 is shown, multiple conveyors may be used with system 10. The conveyor 12, scanner 16, and cutter 18 are coupled to, and controlled by, a processor 20. Generally, the scanner 16 scans in the workpiece 14 to produce scanning information representative of the workpiece, and forwards the scanning information to the processor 20. The processor 20 analyzes the scanning information to calculate an optimal cut path to portion the workpiece 14 into one or more desirable pieces. Then, the processor 20 controls the cutter 18 to portion the workpiece 14 according to the calculated cut path.

As illustrated, the processor includes an input device 22 (keyboard, mouse, etc.) and an output device 24 (monitor, printer, etc.). Also, other processing tools or equipment 26 can be utilized in addition to, or in place of, cutter 18.

Further, additional scanners 28 and 30 can be employed to scan the workpiece and/or portions cut therefrom later along the processing line. The present invention is directed generally to a system and method for cutting workpieces to a particular or approximate shape, while considering one or more other parameters (e.g., weight, length, width, height, etc.).

Describing the foregoing in more detail, the scanning system may be of a variety of different types, including a video camera (as discussed above) to view a workpiece 14 illuminated by one or more light sources. Light from the light source is extended across the moving conveyor belt to define a sharp shadow or light stripe line. When no workpiece is being carried by the infeed conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly at an angle on the workpiece and the shadow line/light stripe. The video camera detects the displacement of the shadow line/light stripe from the position it would occupy if no workpiece were present on the conveyor belt. This displacement represents the thickness (height) of the workpiece. The width of the workpiece is determined by the width of the irregular shadow line/light stripe. The length of the workpiece is determined by the length of belt travel that shadow lines/light stripes are created by the workpiece. In this regard, an encoder 32 is integrated into the conveyor, with the encoder generating pulses at fixed distance intervals corresponding to the forward movement of the conveyor.

In lieu of a video camera, the scanner 16 may utilize an X-ray apparatus (not shown) for determining the physical characteristics of the workpiece, including its shape, mass, and weight. X-rays may be passed through the object in the direction of an X-ray detector (not shown). Such X-rays are attenuated by the workpiece in proportion to the mass thereof. The X-ray detector is capable of measuring the intensity of the X-rays received thereby, after passing through the workpiece. This information is utilized to determine the overall shape and size of the workpiece 14, as well as the mass thereof. An example of such an X-ray scanning device is disclosed in U.S. Pat. No. 5,585,603, incorporated by reference herein. The foregoing scanning systems are known in the art and, thus, are not novel per se. However, the use of these scanning systems in conjunction with the other aspects of the described embodiments are believed to be new.

The data and information measured/gathered by the scanning device(s) is transmitted to the processor 20, which records the location of the workpiece 14 on the conveyor 12 as well as the shape, length, width, thickness, size, outer perimeter, area, weight (typically by using a predicted density of the workpiece) and other physical parameters/specifications of interest pertaining to the workpiece. Processor 20 can be used to determine and record these physical parameters/specifications with respect to the workpiece as it exists on the conveyor 12 as well as determine these physical parameters/specifications for the workpiece or for portions cut from the workpiece after further processing or after completion of processing. For example, if the workpiece 14 is in the form of a raw chicken breast, fish fillet, or similar workpiece, processor 20 can be used to determine the size, shape, length, width, thickness, area, outer perimeter, and weight of the workpiece, or portions thereof, after cooking, whether such cooking is by steaming, frying, baking, roasting, grilling, boiling, etc.

As noted above, data concerning the desired workpiece, or portion parameters/specifications, as well as the effect on workpieces and/or portions of further processing, may be stored in the memory portion 34 of the processor 20. The information stored in memory can readily be selected by user via user interface 22, for example, when changing product lines. For instance, the user may be processing chicken breasts for a particular customer who may require specifications for the portions to be cut from the chicken breasts. When the order for that customer is filled, the user may switch the mode of the computer to meet the specifications of a different customer. The switch may be automated and triggered by a counter that keeps track of the number of product portions that have been processed, or the switch may be carried out manually to allow the user time to retool any apparatus or recalibrate the equipment.

The system 10 can be used to process (e.g., portion) workpieces 14 according to the present disclosure. In this regard, the decision process in determining where to locate desired portions on a workpiece can be thought of in terms of directly controlled physical parameters (and specifications) and indirectly controlled physical parameters (and specifications). For example, in algebra, Y is said to be a function of X or $Y=F(X)$. The directly controlled physical parameters (specifications) are the independent variables, such as "X." The indirectly controlled physical parameters (specifications) are the dependent variables, such as "Y," and result from the input of the directly controlled physical parameters (specifications). In the context of the present invention, directly controlled physical parameters (specifications) represent actions that occur when the workpiece is processed, e.g., portioned or sliced. Having made cuts (or simulated the cuts) of the workpiece, the resulting portions have properties that constitute the indirectly controlled physical parameters (specifications).

In accordance with the present invention, it is possible to consider the effect of meeting (or controlling) user-specified directly controlled physical parameters (specifications) and other resulting physical parameters (specifications) that are not directly controlled, prior to cutting. Specifically, the present invention further offers methods that may be used when a workpiece is being processed by cutting, trimming, slicing, etc., and it is desired that the resulting cut, trimmed, sliced, or otherwise processed product has particular characteristics not directly controlled by the cutting, trimming, slicing, or other process.

Non-limiting examples of directly controlled physical parameters and specifications include:

1. Portion specification(s):
   Shape of the piece or portion;
   Reference coordinates that define the shape of the piece or portion;
   Zoom range (size) of shape in one-dimension of the two-dimensional shape of the piece or portion;
   Zoom range (size) of shape in the other dimension of the two-dimensional shape of the piece or portion;
   Zoom range in two dimensions (size) simultaneously (enlarge or decrease size of shape of the piece or portion).
2. Positioning (location) of portion to be achieved from workpiece:
   Cross belt (X direction) range of the shape of the piece or portion relative to some references;
   Down belt (Y direction) range of the shape of the piece or portion relative to some references;
   Angular orientation range of the shape of the piece or portion relative to some references.

3. Number of pieces or portions to be achieved from the workpiece.

4. Angle of water jet cutter nozzles.

As noted above, the portioning and/or trimming and/or slicing of a workpiece can be carried out by using high-speed water jet cutters. While most cutting with high-speed water jet cutters is carried out with the cutters in a vertical orientation and thus disposed normally or transversely to the workpiece, it is possible to use the high-speed water jet cutters that are set at a fixed angle from vertical, or actively control the angles of the cutters from vertical. If the angle of the water jet cutter is actively controlled, then such angle would be one of the user-controlled parameters.

Examples of indirectly controlled physical parameters and specifications (properties of the portions where cutting, slicing, trimming, etc., has been simulated):

1. Weight of the piece or portion.
2. Shape conformance of the cut, trim, slice, central portion, including any natural edges.
3. Average thickness of the piece or portion.
4. Maximum or peak thickness of the piece or portion.
5. Roughness or flatness, as in variability of thickness of the piece or portion.
6. Length of the piece or portion.
7. Width of the piece or portion.
8. Size (length and/or width of the piece or portion).
9. Plan-view area of the piece or portion.
10. Amount of fat in the piece or portion.
11. Program errors.
12. Down-belt cutter travel required.
13. Holes, tears, concavity, bones, cartilage, etc., in the piece or portion.

It is to be understood that some of these examples of indirectly controlled physical parameters can also be utilized as directly controlled parameters, such as, for example, weight, size, length, and/or width.

In many applications where a combination of two or more physical characteristics (or parameters/specifications) of the finished product are sought (e.g., shape, weight, size, length, width, etc.), it may be that one or more of these characteristics are directly controllable, and others are indirect results of the cutting, trimming, slicing, etc., process. For example, in trimming of chicken breasts, the shape and weight of the resulting trimmed piece may be directly controllable, but the thickness of the resulting piece may not be directly controlled, and thus may vary among multiple final products.

According to a further aspect of the present invention, where one or more physical characteristics cannot be directly controlled and yet are the results of controlling the directly controllable physical characteristics, the directly controllable physical characteristics are selected so as to optimize the indirectly controlled physical characteristics. Specifically, in circumstances where more than one option exists for values of the directly controllable physical characteristics, and where a simulation can be performed to assess the resulting indirectly controlled physical characteristics prior to actually performing the cutting operations, then it is possible to achieve target values or ranges for all physical characteristics. The present invention provides a method of accomplishing this, where the indirectly controlled physical characteristics are measured and classified into one of several categories.

Figure 2:
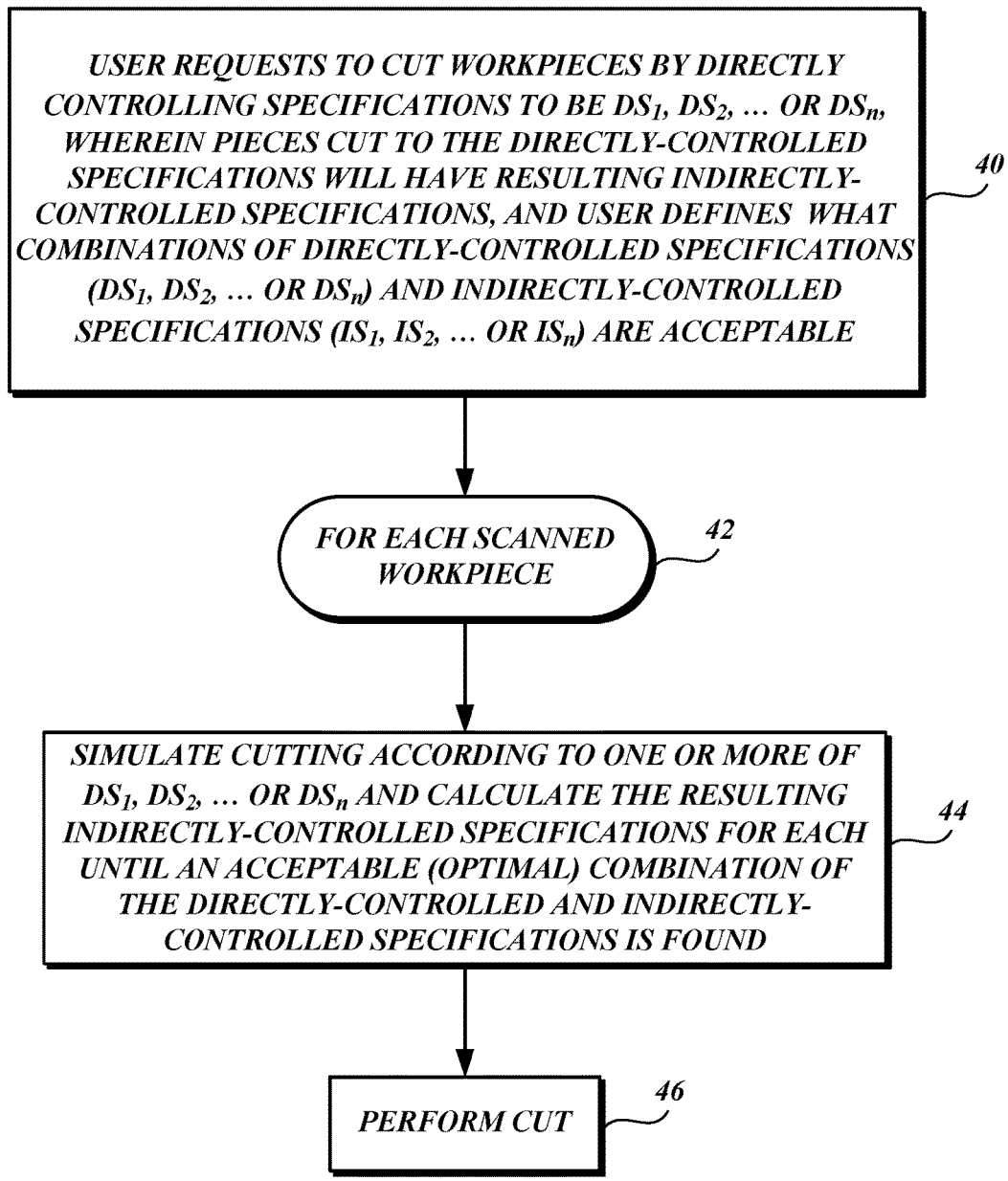
FIG. 2 is a flow chart illustrating a routine for evaluating the effects of cutting to certain specifications on the final product characteristics, which are not directly controlled by the portioning process, prior to performing an actual cut, according to a further aspect of the present invention.

FIG. 2 is a flow chart illustrating a general process of evaluating what effects cutting a workpiece according to certain parameters/specifications will have on the cut piece's other physical characteristics, which are not directly controlled by the cutting process, to ensure that the final piece will have desirable indirectly controlled physical characteristics. In step 40, a user requests to cut workpieces by directly controlling certain parameters (e.g., shape, weight, position, angular orientation, number of portions to be obtained from the work product, etc.) so that they fall within one of multiple acceptable categories, such as by ensuring that one of multiple specification requirements $DS1$, $DS2$, . . . or $DSn$ is met. Further, the user requests that the pieces cut to the specification requirements $DS1$, $DS2$, . . . or $DSn$ need to have one or more resulting indirectly controlled characteristic(s) (e.g., thickness, weight, shape, conformance, etc.), $IS1$, $IS2$, . . . or $ISn$.

Then, for each scanned workpiece (block 42), in block 44, cutting the workpiece according to one or more of the directly controlled physical specifications ($DS1$, $DS2$, . . . or $DSn$) is simulated, and the resulting indirectly controlled physical specification(s) is calculated. For example, cutting according to the specification $DS1$ (e.g., shape) is simulated, and the indirectly controlled physical specification (e.g., thickness) resulting from cutting to the specification $DS1$ is calculated. If an acceptable combination of $DS1$, $DS2$, . . . or $DSn$ and $IS1$, $IS2$, . . . or $ISn$ is found, then the acceptable combination may be selected as the combination according to which the subsequent cut is to be performed. Various methods for selecting one combination are possible. For example, it is possible to continue the simulation and calculation process until the first acceptable combination is found.

Alternatively, a value function (or its negative/opposite, a cost function) may be used to rank multiple alternative solutions. (Value and/or cost functions are also referred to herein as optimization functions.) According to this variation, cutting to the multiple specification requirements ($DS1$, $DS2$, . . . or $DSn$, in this example) is simulated, and the resulting indirectly controlled physical specification(s) (e.g., thickness) are calculated for each simulation and compared to the acceptable indirectly controlled specification(s) ($IS1$, $IS2$, . . . or $ISn$). If multiple acceptable combinations exist, a suitable value function is used to select the most preferable combination.

After the acceptable, optimal combination of $DS1$, $DS2$, . . . or $DSn$ and $IS1$, $IS2$, . . . or $ISn$ is found, then proceeding to step 46, the portioning system is used to perform an actual cut according to the selected combination of the directly controlled and indirectly controlled physical specifications.

As a further aspect of the present invention, each of the characteristics, i.e., parameters/specifications, both direct and indirect, can potentially have an acceptable range rather than just a single acceptable value. It is possible to define a "cost" function that has a value of zero at the center or other location of each range of each specification, with an increasing "cost" as the simulated values of the parameters deviate from the center or other location of the specification range. Further, a weighting factor can be applied to the "cost" from each of the parameters. Finally, the "weighted costs" are combined, such as by addition, to give a "total cost." Thus, for each combination of the directly controlled physical characteristic and resulting indirectly controlled physical characteristic, there is a single "total cost" amount associated with the simulated cutting/trimming/slicing, etc., result. For example, if there are two directly controlled specification requirements, $DS1$ and $DS2$, and two resulting indirectly controlled specification requirements, $IS1$ and $IS2$, and each as a weighting factor, the total cost might be calculated by the simple equation: (Weight 1*$DS1$)+(Weight 2*$DS2$)+(Weight 3*$IS1$)+(Weight 4*$IS2$). It is to be understood that the term "cost" as used herein refers to the negative or opposite of the word "value" discussed above. These terms are related in the sense that with respect to a particular specification, an increase in the "cost" corresponds to a decrease in the "value."

The cost function definition could take almost any form, including one-sided definitions where the characteristic can never be above or below a threshold, and the target (zero cost) value is something other than the middle of a range. An example of this exists from packaged grocery goods where it is legally required that a container not contain less than the labeled amount. However, it is clearly in the interest of the product producer to be as close as possible to the labeled amount.

Examples of three cost functions that can be used include:

1. The cost increases with deviation from the range midpoint, and continues increasing for parameter values beyond the range;
2. The cost increases from a deviation from the range midpoint, with "hard" limits (for example, large step function cost increase) at the range limits;
3. There is no cost associated with values within the range, with "hard" limits at the range limits.

The "total cost" number is used with a multi-dimensional optimization technique, such as the "Gradient Descent" minimization algorithm, to find an optimal choice of directly controlled parameters/specifications. Within a limited number of steps or iterations, it is possible to find the optimal solution without having to consider all of the perhaps thousands of potential combinations of directly controlled parameter values. Examples of non-linear algorithms similar to Gradient Descent include the Gauss-Newton method, the BFGS method, and the Levenberg-Marquardt method. Other algorithms or analysis methods that may be utilized in this regard include, for example, Nelder-Mead method, differential evolutions methods, genetic algorithms, and particle swarm optimization. Of course, in the range of interest, linear algorithms and analysis techniques can be used to arrive at an optimum choice of directly controlled physical parameters It is to be understood that in the above description of identifying optimum directly controlled and/or indirectly controlled physical parameters and specifications, a cost function analysis has been utilized. However, it is also to be understood that the negative or opposite concept of a value function could be utilized instead. In this case, a multi-dimensional maximization technique or algorithm would be utilized to arrive at optimal directly and/or indirectly controlled parameters/specifications.

There can be dependencies between/among the parameters that can be exploited to simplify the solution methods. An example of this is aspect ratio, length and width, each being a parameter despite their obvious dependence. The user may only need to specify length and width ranges, with the aspect ratio being "worked out" in the software.

There are instances in which particular parameters are chosen as directly controlled parameters. Two examples are set forth below. To simplify the present discussion, the examples include only one portion to be derived from a workpiece and only one parameter/specification for the portion.

As a first example, the primary method is to start with a specified shape as a directly controlled physical parameters and zoom the shape in or out in one dimension, such as width; zoom the shape in or out in a second dimension, such as length; move the shape across the workpiece; move the shape lengthwise of the workpiece; and/or rotate the shape to various angles. Even though weight is one of the main physical parameters that may be targeted, this analysis allows weight to be an indirectly controlled physical parameter, which depends on various degrees of zooming and moving about the workpiece to locate an acceptable thickness for the portion. This is considered to be an efficient analysis method.

An alternative methodology is to begin with a specified shape as a directly controlled physical parameter, as further directly controlled parameters utilize weight, aspect ratio (ratio of length over width), movement of the shape up and down the length of the workpiece, movement of the shape across the width of the workpiece, and/or rotation of the shape to various angles. In the background, in a separate algorithm, the zoom (enlargement or reduction) on the shape is adjusted, until a specified weight or weight range is achieved. In this alternative method, "zoom" is then an indirectly controlled physical parameter.

The shape of the desired portion(s) is often one primary, if not the primary, directly controlled physical parameter sought to be achieved. In this regard, the overall shape of the workpiece can be determined, as described above, by scanning the workpiece and then using the processor 20 to analyze the data produced from the scanner 16. In this manner, it is possible to determine if the specified or reference shape of the desired portion(s) can be positioned on the workpiece and what location or locations are satisfactory in this regard. Moreover, a specified portion shape can be enlarged or decreased by zooming in and out in one dimension, such as width or length, or in both dimensions. In addition, the specified portion shape can be moved about the workpiece both laterally and lengthwise of the workpiece. Also, the specified or reference portion shape may be rotated about the Y-axis in an effort to better place the specified shape on the workpiece. In seeking to place the specified shape of the portion on the workpiece, these steps consider the reference shape in its entirety, including the entire area occupied by the reference shape, as well as the outer perimeter and contours of the reference shape. As will be appreciated, a significant amount of computer processing power is needed to carry out the foregoing analysis at an acceptable speed.

Figure 3:
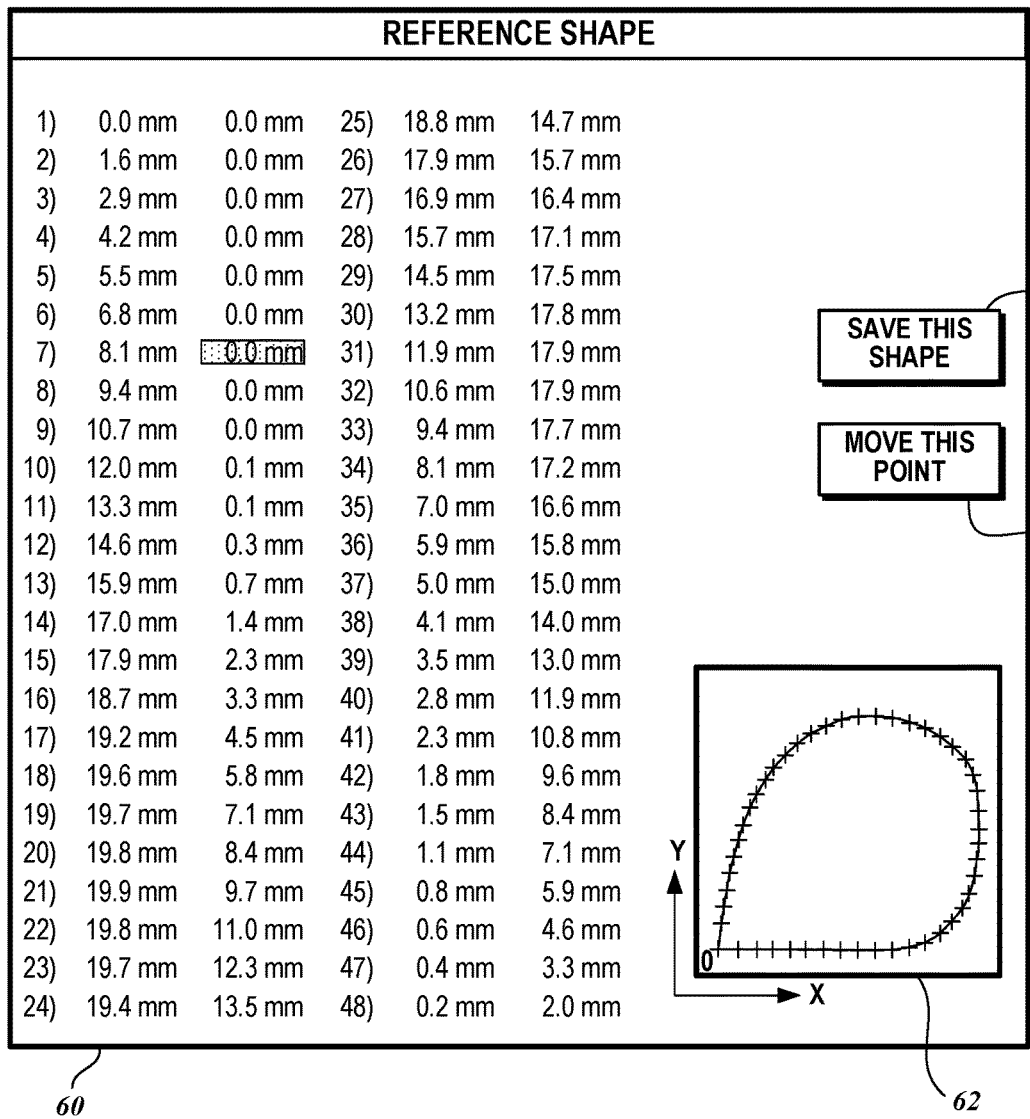
FIG. 3 is a sample simulated screen shot, displayed on a monitor of the portioning system according to one embodiment of the present invention, defining a shape cutting path in a connect-the-dots model.

Rather than considering the shape of the reference piece or portion as a whole in the foregoing analysis, an alternative is to define the portion reference shape by a few control coordinates or points located about the outer perimeter of the portion reference shape. FIG. 3 provides an example of a reference shape of a portion defined by control coordinates or points using a Cartesian coordinates system. In this regard, the X- and Y-coordinates of 48 points about the perimeter of the workpiece WP are defined. These coordinates can be displayed on a screen 60 displayed on monitor 24. The shape defined by the coordinates is shown in a shape window 62 of screen 60. Each of the coordinates can be numbered, and the first coordinate could be defined as the starting point. The unit or scale system used in FIG. 3 consists of millimeters. However, other units of measurement can be used, for example, inches. In addition, although the coordinate system of FIG. 3 is illustrated in terms of a Cartesian coordinate system, any other suitable coordinate system may also be utilized, such as a Polar coordinate system.

The reference shape of FIG. 3, as defined by its control points or coordinates, may be stored in the memory unit 34 of processor 20. Of course, other reference shapes as defined by control points may also be stored in memory. As discussed herein, a plurality of shaped final pieces may be portioned from a single workpiece or section of a single workpiece.

The user may choose to edit the control points of a reference shape during or before application of the thus modified reference shape to the workpieces to be portioned. This editing may be as a result of a customer change or preference in the shape of the final pieces, or perhaps may reflect the user's knowledge of the physical attributes of the current set of workpieces to be portioned.

The reference shape can be edited in a number of different ways. For example, the user can utilize the "Move This Point" icon 64 on the screen 60, and select one of the points or coordinates, which will then be highlighted (see, for example, Point 7 highlighted in the example of FIG. 3). The user may then utilize the arrow keys provided on a standard keyboard, or use the mouse to move the selected point in the X-Y space. For example, pressing the "right" arrow key once will move the point in the Plus-X direction by a certain increment; for example, 0.1 millimeter, while pressing the "up" arrow key once will move the point in the Plus-Y direction by a certain increment.

Figure 4:
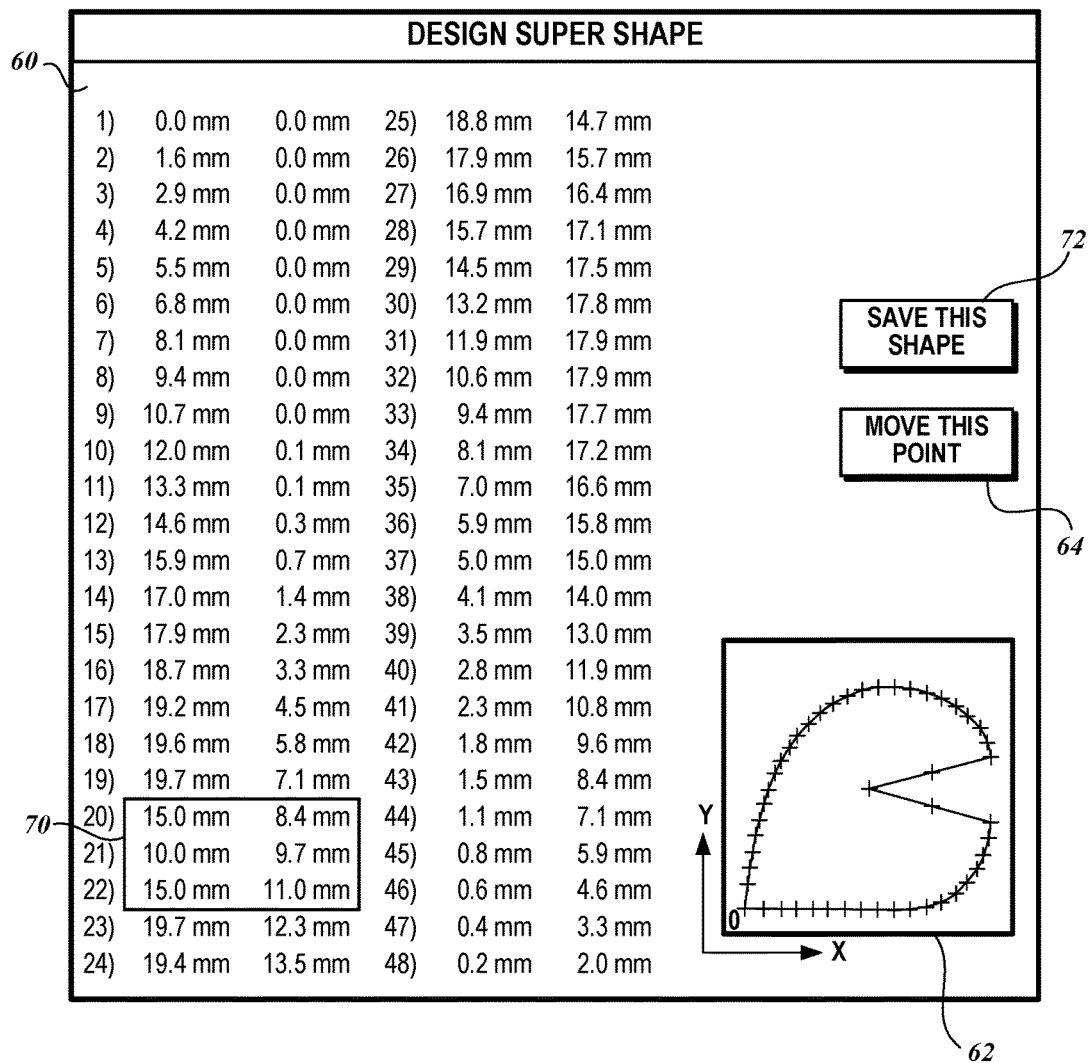
FIG. 4 is a sample simulated screen shot of a shape cutting path, which has been modified from that shown in FIG. 3, by including a notch into the shape of FIG. 3.

Alternatively, referring to FIG. 4, the user may select the X or Y value of a reference point to be edited, and then simply type in a new value directly onto the listing shown in screen 60 of FIG. 4. For example, the user may select the X and Y values for points 20, 21, and 22 by, for example, highlighting Section 70 on the screen 60, and then directly entering new X and Y values to the listing. As the user enters such new values, the shape outlined in window 62 changes to correspond to the new X and Y values of these points. Once the editing of the reference shape has been completed to the satisfaction of the user, the user may select a "save this shape" icon 72, positioned on screen 60, to save the modified shape into memory 34. Of course, the program may allow the user to have the X and Y values automatically saved during the editing process.

As noted above, a library of reference shapes may be stored in memory 34, and such shapes may be edited by the user. In addition, it is possible to create a new shape by defining the X and Y coordinates for all control points, for example, points 1-48 in FIGS. 3 and 4.

Although FIGS. 3 and 4 illustrate a reference shape defined by 48 control points, it is to be understood that a fewer or greater number of control points may be utilized to define the reference shape. For example, as few as 3 points may be sufficient, depending on the shape of the desired final portion, or perhaps up to 10, 12 or even a larger number of control points may be utilized if the final shape is relatively complex. Of course, the greater number of control points utilized, the greater the processing capability would be needed to apply the reference shape to workpieces in a timely manner.

Once the reference shape has been edited, certain of the control points may be accented. The purpose of such accented control points is to modify the edited shape, for example by moving the accent points in or out. Such movement of the accent points is useful to modify the edited shape to accommodate the shape of the workpiece or to achieve one or more other directly or indirectly controlled parameters, such as weight, thickness, or avoidance of undesired physical features (such as cartilage, bone, or fat) on the workpiece. The computer analysis system being used can move the accent points to fit the workpiece, as well as based on other criteria.

Also, applicants have found that the use of reference coordinates to define desired shapes of the final pieces makes it possible to readily change the shape of the final pieces when fitting final pieces on a workpiece. Sometimes a slight adjustment in shape will tend to be a much better "fit" of the shape on the workpiece, while at the same time avoiding tears, voids, cartilage, etc., in the workpiece. This results in a better yield from the workpiece.

As noted above, one of the identified indirectly controlled physical parameters or specifications is the shape conformance of the final piece to the initial reference shape; in other words, the extent to which the shape of the final piece deviates from the desired or ideal reference shape. This information is also employed in the optimization analysis used with a cost or value function to analyze for optimal combinations of directly or indirectly controlled physical parameters or specifications. For "one dimensional" parameters or characteristics, such as weight, length, width or thickness, the deviation of the parameter or characteristic from a mid-point or defined zero cost point is easily analyzed.

But, for the shape of the desired final piece, the deviation or conformance thereof from a desired reference shape is not as simply analyzed. However, there are numerous techniques for analyzing such conformance or deviation. One such analysis may look at each of the control points of the reference shape versus the location of the corresponding control points of the proposed final shape once the reference shape has been adjusted into a modified shape and placed on the workpiece at a potential, acceptable location. The deviation between the control points of the reference shape and the corresponding boundary or edge of the proposed final piece can be measured. In this regard, in the example shown in FIG. 5, control point number 80A is located within the boundary of the proposed final piece 78 at corresponding location 78A, and this distance deviation is noted. Correspondingly, control point No. 80F is beyond the boundary of the perimeter of the proposed final piece 78 at corresponding location 78F. The distance that the control point 80F is exterior of proposed final piece 78 is noted. This analysis is carried out for all of the control points 30A-30H of the reference shape shown in FIG. 5. Moreover, this analysis also can be carried out at other locations along the perimeter of reference shape, such as at the unnumbered locations shown in FIG. 5. Thereafter, the mean and standard deviation that the control points vary from the corresponding location on the workpiece (potential final shape) is calculated. These values may be used to determine whether the reference shape being utilized is within an acceptable conformance range.

Figure 5:
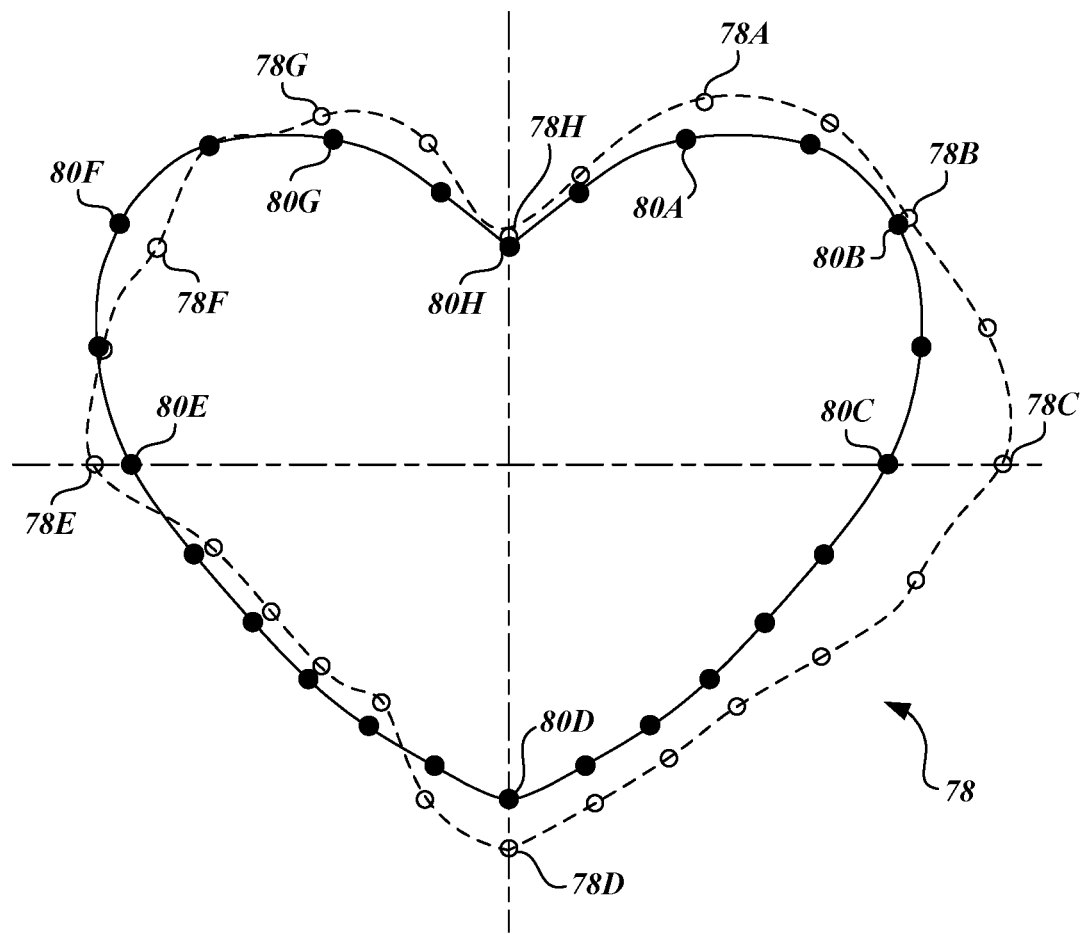
FIG. 5 illustrates a method of calculating the conformance between a reference shape and actual position shape.

Another example of analyzing the conformance of the reference shape on the workpiece includes calculating a Root-Mean-Square (RMS) error between each of the reference points and the corresponding points on the proposed final piece. In this analysis the reference shape can be considered as a whole or perhaps be divided into sections, for instance into quadrants as shown in FIG. 5. Thereafter, for each of the reference shape quadrants, the difference in the position of the control points relative to the actual corresponding location on the proposed final piece is calculated. This difference can be readily calculated by using the X-Y coordinates of the position of each of the reference points as the square root of the sum of the squares of X and Y errors. Thereafter, the square values of these distances are summed up and the sum is divided by the number of corresponding points, and finally the square root of the quotient is taken as the RMS error value between the reference shape and the proposed final shape.

As an alternative to the foregoing analysis method, maximum RMS error value allowable between the reference shape and a potential final shape may be selected and used to define the acceptable shape requirements. Thus, unlike the previous described method, in which maximum RMS value was calculated based on an actual comparison between a reference shape and a proposed final shape, in this alternative method, the maximum RMS error value may simply be selected or predetermined by the user. In essence, the acceptable shape requirement is being defined in terms of the percentage of the area of the final piece not conforming to the reference shape.

In another example, the acceptable shape requirements may be defined based on a reference shape, by taking the perimeter of the reference shape as providing the mean positional values and by further selecting a standard deviation value that defines acceptable deviation from the mean positional values. In this example, a confidence limit may be defined in terms of the standard deviation in each of various perimeter points along the reference shape. The user can modify the allowable shape variation by changing the confidence limit or the number of allowable standard deviations. Of course, other methods of defining acceptable shape requirements based on a reference shape will be apparent to one skilled in the art.

As discussed above, an optimization function in terms of a cost function or a value function can be used to rank multiple alternative potential final piece configurations portioned from a workpiece. Of course, the optimization function can be applied with respect to the use of control points in defining acceptable shapes for final pieces. In this regard, shape conformance can be one component in an overall optimization function. With respect to a cost function analysis, a cost can be associated with how far a proposed final shape deviates from a reference shape using a conformance analysis, for example, one of the methods described above. In the cost function, a zero value can be ascribed to the situation in which the proposed final portion shape matches the reference shape. As the proposed final shape deviates from the reference shape, costs can be ascribed to such deviation whether in a linear relationship or otherwise. Moreover, the cost function can also take into consideration whether the shape of the proposed final piece is larger than or smaller than the reference shape. In this regard, if it is important to have a minimum size or shape, the cost associated with a proposed final piece having a shape smaller than the reference shape can be set at a higher cost in deviating from the reference shape in terms of the final shape being larger than the reference shape. In essence, a weighting factor is applied for proposed final shapes that are smaller than the reference shape.

Of course, although shape may be a directly controlled physical characteristic, indirectly controlled physical characteristics may also be of importance. For example, an indirectly controlled physical characteristic might be the weight of the final piece, the average thickness of the final piece, the maximum thickness of the final piece, the amount of fat in the final piece, the conformance of the shape of the final piece to the desired reference shape, etc. These indirectly controlled physical characteristics may also be considered in the cost analysis, and also be weighted in value, just as directly controlled physical characteristics may be weighted in value. As such, as discussed above, for each combination of shape as a directly controlled physical characteristic and the resulting indirectly controlled physical characteristic(s), a 'total cost' amount associated with the proposed final piece can be determined. Also, although this portion of the discussion focused on a "cost" analysis, it is to be understood that the analysis may instead be carried out in terms of a value function.

Figure 6:
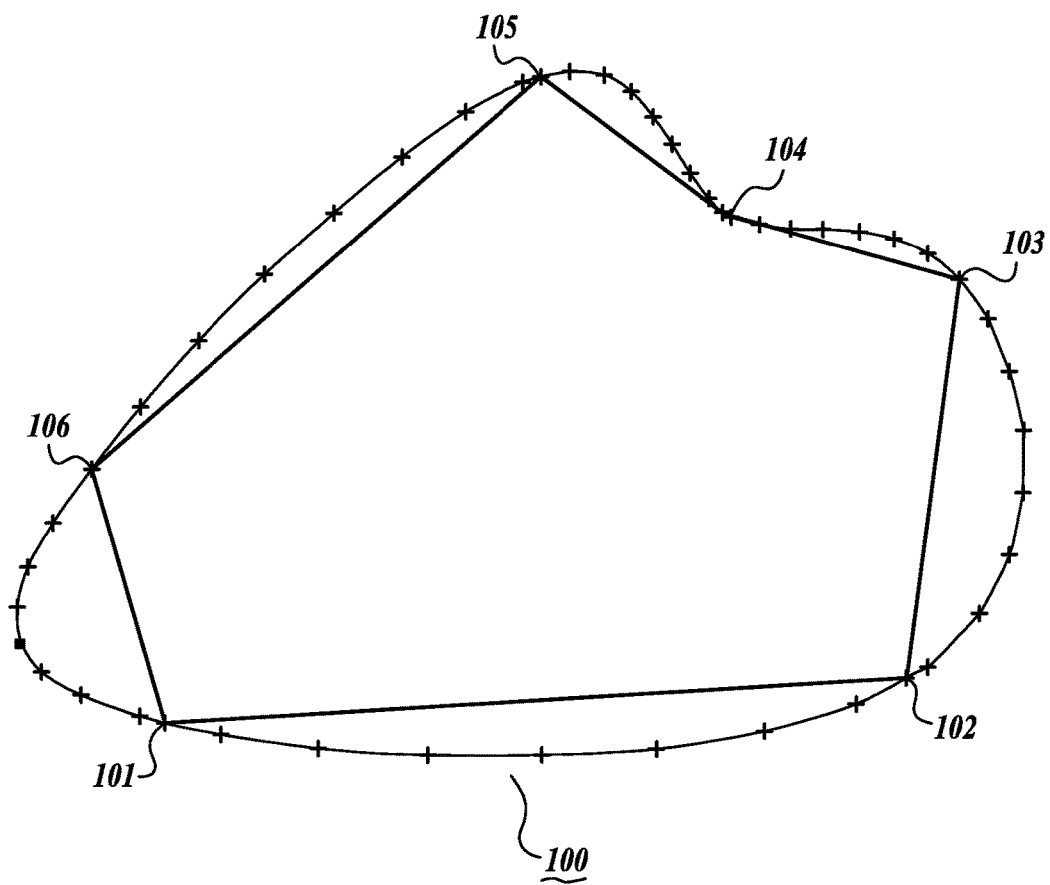
FIG. 6 is a screen shot of a reference shape defined by a plurality of reference coordinates and a shaping algorithm.

FIG. 6 is a further example of the present disclosure wherein a portion shape 100 is defined by six control points 101, 102, 103, 104, 105, and 106. Straight lines are used to connect the control points, resulting in an irregularly shaped hexagon. A curve-fitting algorithm is then utilized to interconnect the control points in a smooth reference shape. In the present example, the smooth reference shape lies beyond the exterior of the hexagon. The reference shape 100 is then applied to workpieces. To this end, shape conformance rules are utilized that allow for deviation from the shape 100 with a weighted cost function (or value function) associated with such deviation. In this regard, the coordinates of the control points can be moved relative to each other to thereby alter the reference shape. Also, the control points can be moved as a set about the workpiece in seeking a best fit of the modified reference shape on the workpiece. Driven by an optimization algorithm, the overall cost function being used is sought to be minimized as the control points are moved relative to each other, as well as as a set about the workpiece. In addition to seeking to minimize the cost function due to deviation of a proposed portion shape from the beginning or reference shape, as in the examples discussed above, other specifications may also be considered in the optimization algorithm, including indirectly controlled weighted physical specifications such as weight, thickness, roughness, etc. Thus, the optimization algorithm typically will be composed of selected directly and indirectly controlled physical characteristics. Generally, these will be one component and one weighting factor for each such directly controlled and indirectly controlled characteristic that composes the optimization function. Such components can be combined in an additive manner (e.g., weight1*component1+weight2*component2), or in some other manner that combines the algorithm components in a manner to reflect importance, value, cost, etc., of the directly and/or indirectly controlled characteristics composing the optimization algorithm.

Moreover, various template rules may be utilized in addition to shape conformance rules. These template rules can pertain to one or more desired outer perimeter configurations of the portion piece. The template can be quite simple, for example, a desired length and width or, as another example, a length range and a width range. As a further example, the template can be in the shape of a bun or roll, and the proposed portion piece can be a chicken breast, a beef patty, a fish fillet, or other food product to be placed on or within the bun or roll. In addition, the bun can be of various shapes, for example, circular, square, oval, rectangular, etc.

For certain types of food items, including various types of sandwiches served at fast food restaurants, it is desirable that the meat, poultry, or fish is visible, and even extend beyond the perimeter of the bun, roll, etc., so that the meat, poultry, or fish is not hidden inside the bun, roll, etc. On the other hand, it is not desirable if the meat, poultry, or fish extend too far beyond the perimeter of the bun, roll, etc. Examples of various shapes of buns and rolls are shown in U.S. Pat. No. 7,949,414, incorporated herein by reference. The '414 patent also shows various meat, fish, poultry, etc., items placed on the buns and rolls illustrated. The '414 patent discusses various shape-based conformance rules that may be applied to the portioned pieces relative to coverage of the bun or roll by the portion pieces. Such conformance rules may be utilized with respect to reference shapes defined by selected control points in accordance with the present disclosure.

As noted above, perhaps one of the simplest executions of the present method, the coordinates of the control points are moved about the workpiece as a set, as well as relative to each other, by an optimization algorithm in an effort to minimize the associated overall cost function being employed. Rather than utilizing only the movements of such control points, applicants have found that acceptable solutions can be facilitated by applying up to four additional directly controlled shape related parameters, including zooming of the shape (enlarging or reduction), rotation of the shape, and moving the shape as a whole in the x direction and/or y direction. While simply moving the control points directly can eventually achieve the same result as using these additional shape parameters, applicants have found that utilizing these four additional directly controlled shape parameters as a group often results in reaching an acceptable solution more quickly. Of course, not all four additional directly controlled shape parameters need be used. Rather, one or more of these additional shape parameters may be employed, such as zoom in the x direction or zoom in the y direction, rather than a single undistorted zoom in both the x and y directions simultaneously.

Moreover, the optimization algorithm is capable of determining what new value for the reference points to try next to seek to minimize the overall cost function. The optimization algorithm recommends new values for each of the directly controlled physical parameters based on previous values and upon the computed value of the cost function. With a new set of directly controlled physical parameters recommended by the algorithm, the indirectly controlled physical parameters are calculated and then a new cost function value is calculated using the directly and indirectly controlled physical parameter values. This new value is used by the optimization algorithm to recommend another set of new values for each of the directly controlled parameters. As will be appreciated, a change in the values of the reference points results in a change in the reference shape into a modified shape, as well as perhaps a change in the location and perhaps also orientation of the modified shape on the work product.

Figure 7:
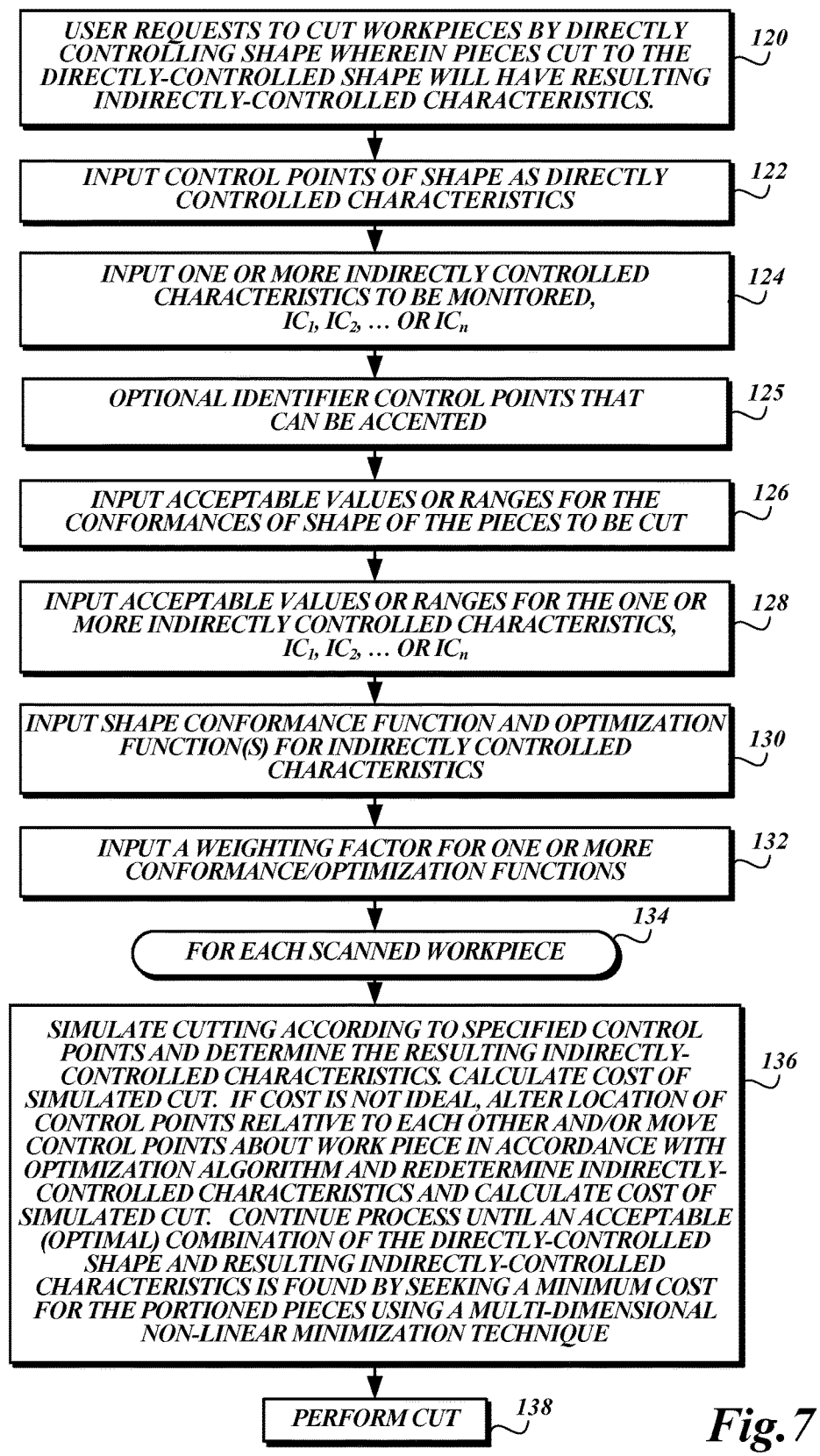
FIG. 7 is a flow chart illustrating a routine for evaluating the effects on indirectly controlled parameters or specifications of a workpiece based on selected directly controlled shape parameters or specifications prior to performing an actual cut, according to another aspect of the present invention.

FIG. 7 is a flow chart illustrating one example of a process or method for determining how to cut a workpiece based on shape of the portioned piece as defined by control points as a directly controlled physical characteristic to achieve desired one or more indirectly controlled characteristics (parameters or specifications) of the resulting portioned piece. Although the example pertains to cutting a workpiece, other processes may be applied to the workpiece, either in conjunction with cutting or in lieu of cutting, such as trimming the workpiece, slicing the workpiece, or performing one or more other operations on the workpiece.

In step 120, a user requests to cut the workpieces by directly controlling the shape of the portion on the workpiece, or number of portions to be derived from the workpiece, so that the resulting portion(s) meet the desired shape criteria.

In the process, in step 122, the user inputs the control points of the desired shape of the portioned piece as directly controlled characteristics.

Next in step 124, the user inputs one or more resulting indirectly controlled characteristics $IC_1, IC_2 \ldots IC_n$ (parameters or specifications) to be met by the portions that meet the desired shape requirement.

Next at step 125, the user optionally identifies control points that can be accented. These control points can be manipulated, for example, by the processor, to modify the reference shape as needed to best fit the reference shape on the workpiece or to best achieve one or more indirectly controlled parameters.

Figure 8:
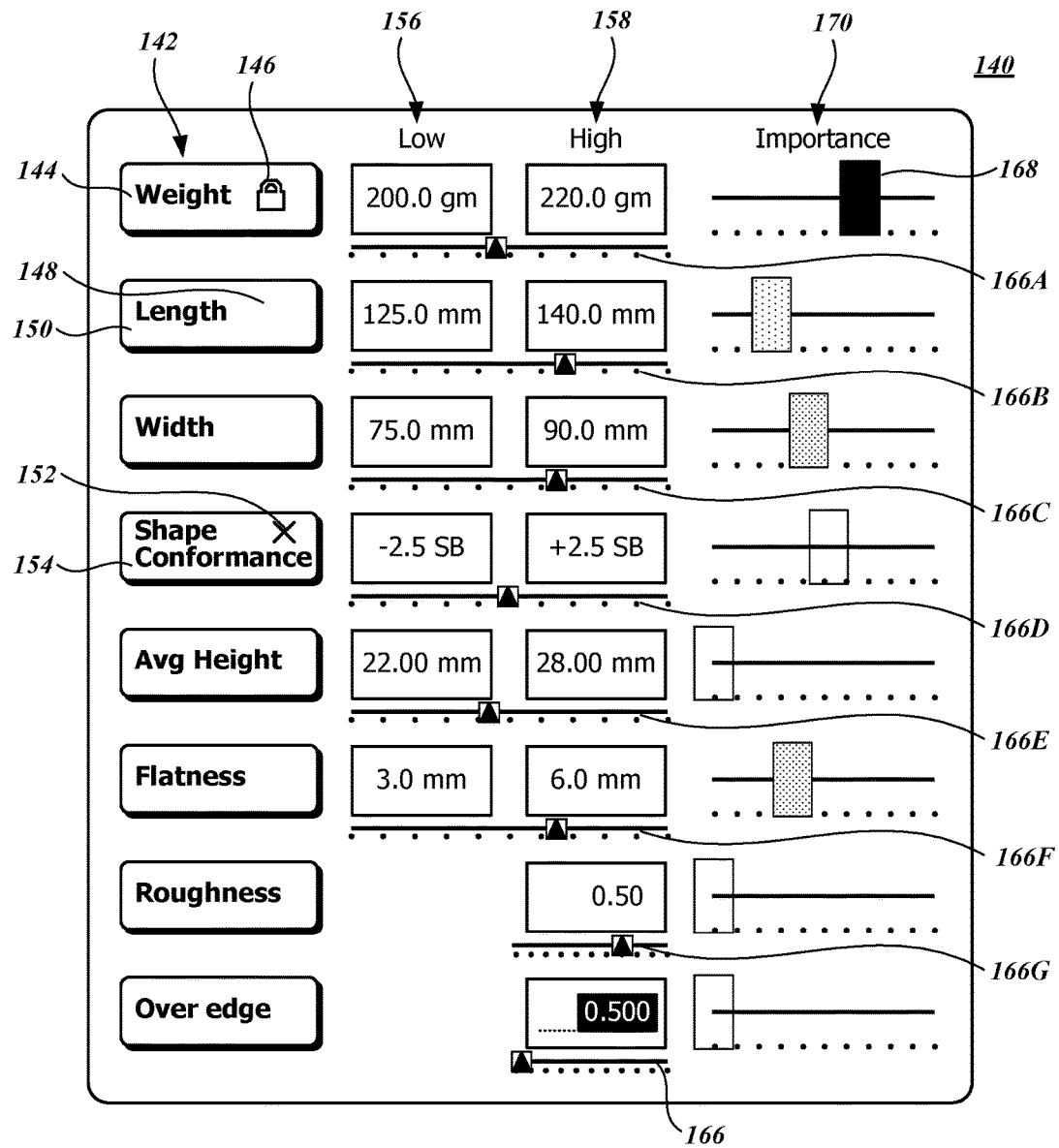
FIG. 8 illustrates a graphical user interface that may be employed with the systems and methods of the present invention, including that illustrated in FIG. 7.

Next at step 126, the user inputs acceptable ranges or values for the conformance of the shape of the final pieces relative to the reference shape. As discussed below, this can be performed using a graphical user interface, for example, as shown in FIG. 8.

Next in step 128, acceptable values or ranges for the one or more indirectly controlled characteristics $IC_1, IC_2 \ldots IC_n$ (parameters or specifications) are inputted.

Next in step 130, a conformance function can be assigned to the directly controlled shape parameter. Also, optimization functions can be assigned to the one or more indirectly controlled characteristics (parameters or specifications). As discussed above, the conformance and optimization functions can be in the form of a cost function. As an example, the cost function can have a value of zero at the center of the range of each specification, with an increasing cost as the simulated value of the parameter in question deviates from the center of the specification range. Also, as discussed above, the cost function definition can take many other forms, including one-sided "definitions" where parameters can never be above or below a threshold value, and the target (zero cost) value is other than at the middle of a range.

Next at step 132, a weighting factor can be assigned to one or more of the costs of a parameter, thereby to establish that some cost factors are more important or less important than other cost factors.

Figure 9D:
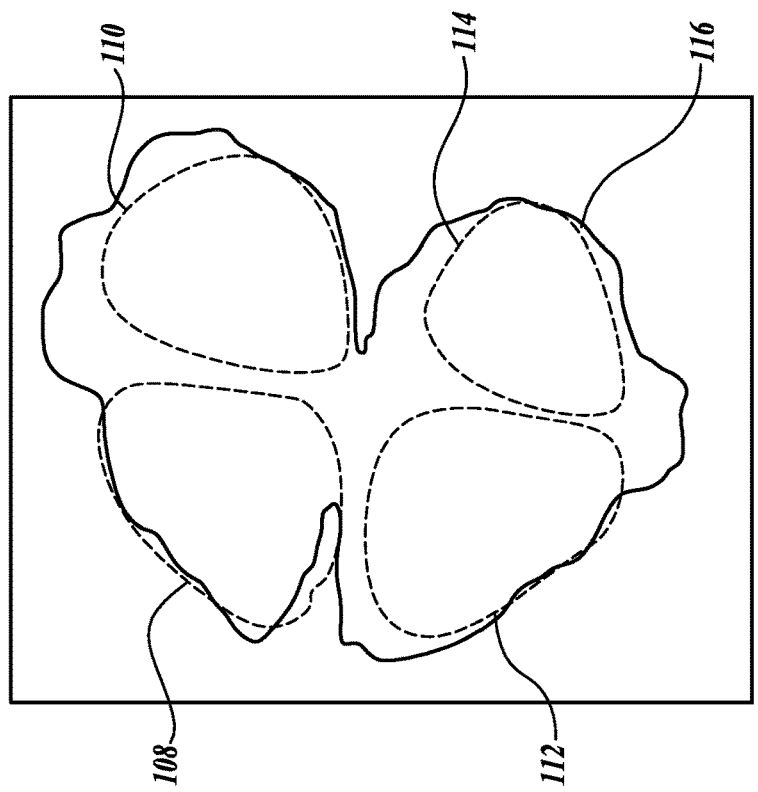
Figure 9C:
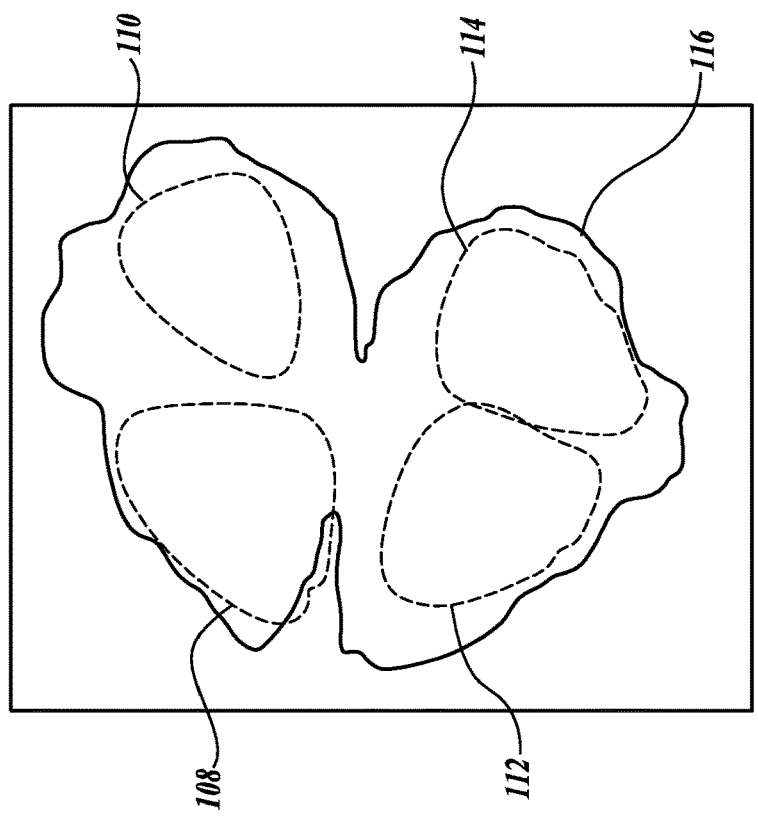
Figure 9F:
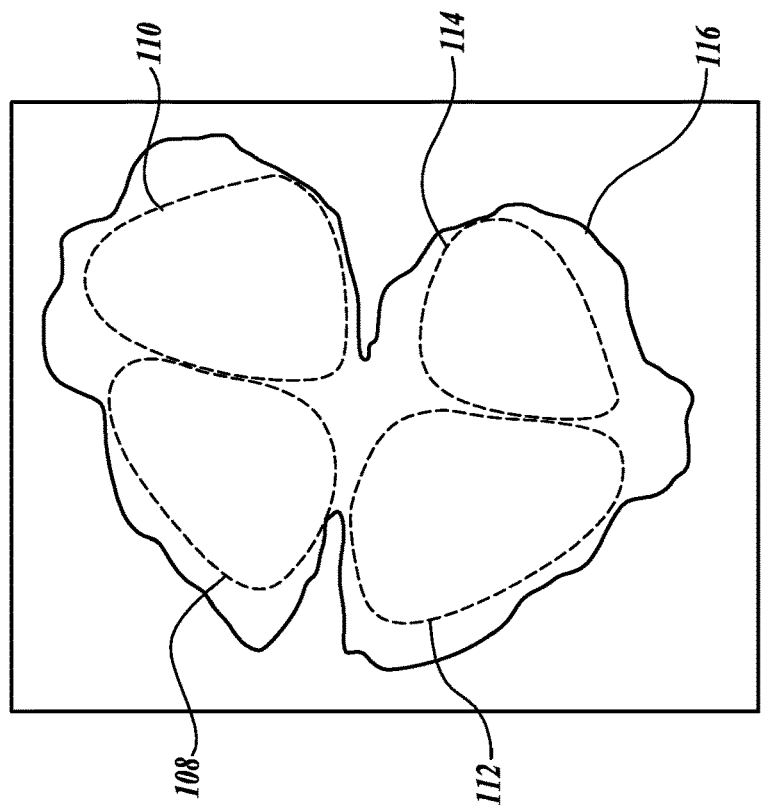
Figure 9E:
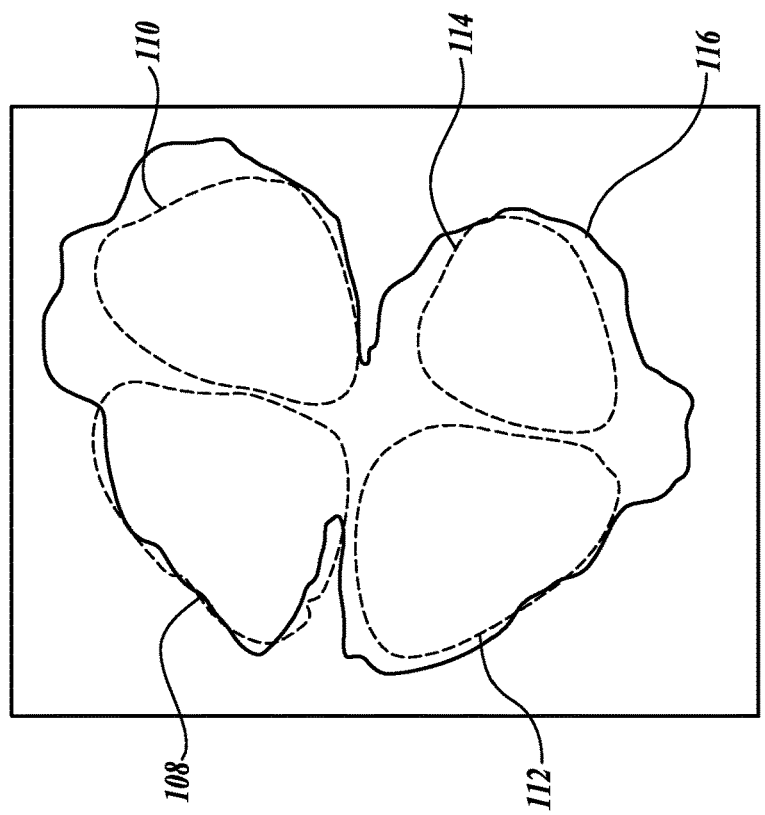

Then for the scanned workpiece (block 134), in block 136, simulating the cutting of the workpiece occurs according to the directly controlled shape parameter, and the resulting indirectly controlled physical characteristics $IC_1, IC_2 \ldots IC_n$ (parameters or specifications) are calculated or determined using, for example, processor 20. For example, cutting according to the shapes 108, 110, 112 and 114 shown in FIG. 9A, positioned on workpiece 116 is simulated and the indirectly controlled physical parameter IC (e.g., weight) resulting from the cutting to the specified shapes is calculated. This may be carried out by seeking to minimize the "total cost" of the resulting portion using a multi-dimensional minimization technique. In this technique, the accent points of the reference shapes can be moved relative to the entire reference shape. Alternatively, or in addition, the entire reference shapes can be moved linearly, rotated, zoomed in or out in size and/or zoomed in one direction. In this manner, a minimum cost or an acceptable cost can be achieved, typically after a discrete number of calculation iterations. This eliminates the need to perform calculations for every possible reference shape variation.

FIGS. 9A through 9F illustrate iterations of this optimization process as controlled by the processor, wherein four final pieces 108, 110, 112 and 114 are placed on a workpiece 116 that is quite irregular in shape. The algorithm used in the cost minimization analysis is capable of selecting new values for some or all of the control points that define the reference shape. This reduces the number of analysis iterations that are needed to arrive at an acceptable solution for the shapes and placements of the reference shapes on the workpiece. This analysis must be carried out very quickly to meet acceptable production goals and schedules, typically well within one second.

After an acceptable and/or optimal combination of shape and indirectly controlled physical parameters and specifications is arrived at (see FIG. 9F), then, at step 138, the portioning system is used to perform cutting according to the selected combination for the shape(s).

As discussed above, optimization functions (cost value functions) can be assigned to one or more of the directly controlled shape and/or indirectly controlled physical characteristics (parameters or specifications) to achieve certain desired end results, for example to obtain the highest yield from the workpiece in terms of utilization of the workpiece. Other end goals may include portioning the workpiece to obtain the highest value from the workpiece. In this regard, certain final piece shapes and sizes portioned from the workpiece may be more valuable than others. For example, cutting a section of the workpiece into the shape of a sandwich portion may be more valuable than cutting the same section of the workpiece into the shape of nuggets or strips. Another goal might be to fulfill a customer's order. For example, a customer may have ordered a certain number of sandwich-shaped portions, a certain number of strip-shaped portions, and a certain number of nugget-shaped portions. As such, the optimization functions that are applied to the directly controlled shape and/or indirectly controlled characteristics may be designed with this in mind.

Moreover, under the present invention, it is possible to simultaneously run multiple optimization function analyses on the workpiece when seeking desired end results. Based on such analyses, it may be that characteristics of the most desirable of the various analyses results will be chosen, or perhaps the characteristics corresponding to the first analysis that results in an acceptable solution may be chosen as the strategy for portioning the workpiece. As another alternative, the characteristics that result in the larger number of end pieces of a desired shape or that provides a desired set of final pieces that meet the desired shape characteristic(s) might be chosen.

The portioning method and system of the present disclosure also may be operated with a plurality of optimization function analyses running at the same time on the workpiece, to quickly meet the shape parameter(s) and the indirectly controlled parameters. For example, one analysis may be seeking to position two final portions per workpiece, and if an acceptable solution with respect to the final pieces is not achieved, then the workpiece may be analyzed for positioning one final piece on the workpiece. In reference to FIGS. 9A through 9F, if an acceptable solution could not be reached to place four final pieces on the workpiece, then analysis could have been carried out seeking perhaps to locate three, or even two, final pieces on the workpiece.

Another alternative analysis may be attempting to place two 65 gram final pieces on the workpiece or two 105 gram final portions on the workpiece. Perhaps the two 65 gram portions would result in a low yield (resulting in significant trim or waste), and the 105 gram portions may result in a high yield or perhaps the two 105 gram portions would not fit on the workpiece. Thus, different sets of specifications are being applied to the workpiece at the same time using different optimization functions.

FIG. 8 shows a portion of a graphical user interface (GUI) 140 that may be used in conjunction with the present invention. In the GUI of FIG. 8, the column of parameters 142 extending down the left side of the GUI (weight, length, width, angle, etc.) are indirectly controlled parameters that contribute to the cost function. By repeatedly pushing the touch screen buttons, such as weight button 144, the weight value toggles through having a padlock symbol, such as 146 on button 144, no symbol on button 150, or an "X" symbol 152 on shape conformance button 154. The lack of a symbol on button 150 corresponds to the first cost function described above, the padlock symbol 146 on button 144 corresponds to the second function described above, and the "X" symbol 152 on button 154 corresponds to the conformance cost function described above.

The columns in FIG. 8 labeled low 156 and high 158 contain user-settable values of the minimum and maximum value per product specifications of the end products. The horizontal lines 166A through 166H, each with a triangular shape disposed thereon, show a short-term average value of recent settings so that the user can visualize the process of the present invention that is occurring. The actual values being achieved, as well as the set range for the parameters and the weighting coefficients, can be retained by the processor being utilized, for example, processor 20, and displayed to the user using a GUI on, for example, output device 24 or other display, such as a tablet (not shown). This data can be shown in list format or in various graphical formats that show the distribution of that data over time or over recent work products. Also, statistical analysis of the data can be carried out and displayed. Such statistical information might include, for example, mean, medium, and standard deviation values. Such information can be analyzed and displayed to show how well the desired parameters and specifications are being met as well as what trade-offs are taking place to arrive at the final pieces portioned from the work product. It will be appreciated that the foregoing information would be very valuable to have available during the portioning of work products, including if the value, range, and/or importance of one or more directly controlled and/or indirectly controlled parameters are changed.

The rectangularly shaped sliders 168 located under the "Importance" header 170 let the user adjust the weighting coefficients in the optimization function for individual parameters. The system of the present invention seeks to keep the specifications within bounds, particularly for the parameters that are given the greater importance. However, algorithms cannot "create" input portions that do not exist given the parameters and specifications specified. Thus, for example, if the thickness of the workpiece is too thin throughout the entire workpiece such that within the length and width limits it is not possible to achieve the desired weight, some other solution will have to be sought.

In the example of FIG. 8, the Weight parameter is set to be near the center of the range (see 166A), but the Length and Width parameters (see 166B and 166C) are above the center of their ranges because the workpiece is too thin. The Weight value is closer to the center of the range than the Length and Width values because Weight was given a greater importance. The shape that is being zoomed and moved about the workpiece may be specified in terms of shape conformance.

In FIG. 8, specific physical parameters may be considered in portioning a workpiece. Not all of these parameters need be considered in each instance that workpieces are being portioned. Also, other sets of parameters may be used in conjunction with a portioning system or machine. Also, it is anticipated that the system operator will set the specification ranges in columns 156 and 158 as well as the weighting level (Importance) column 170. Moreover, these settings may be changed quite often, for example, to adjust for changes in the physical attributes or types of workpieces being processed.

In some situations, such as end portions to be placed in a "family pack" of retail meat packages, there is little desire for close weight control of the portions. In such an instance, the weight setting along the "Importance line" may be moved all the way to the left, and some other parameter's importance moved up the scale (to the right).

Another situation with a different need for weight control is when an adaptive slicer follows a portioner. In that situation, the portioner computer plans for having the slicer bring the weight to the correct level so that the importance of the Length and Width parameters would increase and the Weight simply needs to be greater than or equal to the desired final weight.

The preset invention can also be utilized to optimally position or lay out a grid of nuggets on the workpiece, whether at a location on part of the workpiece or on the entire workpiece. In this regard, an initial nugget grid can be laid out on the workpiece approximately to the correct size to achieve the desired weight and aspect ratio or other shape criteria. The nuggets do not necessarily have to be rectangular in shape, but can be of other shapes, for example, square, triangular, round, etc. A cost function can be applied to the nuggets based on meeting the desired shape, size, weight, aspect ratio, or other criteria applied to the nuggets. With this cost function, the coordinates of the grid intersections of the nuggets can be varied as the independent variable, or "directly controlled parameters." The cost function is designed to increase cost as individual nuggets of the grid are out of specification. The cost function can be designed to monitor both the total cost of the collection of nuggets, and the cost associated with each nugget. Successive optimization determinations can be made by movement of the grid pattern about the workpiece. After each optimization calculation, the highest cost nugget or nuggets can be identified and eliminated prior to the next optimization. Such highest cost nugget or nuggets will be located along the outside of the grid pattern. This typically would reduce the number of grid intersections and sharpen the focus on the remaining potential nuggets. Also, the convergence criteria for each of the optimization iterations could be relaxed somewhat to reduce the processing time for each optimization calculation. Once all of the nuggets in the grid are within a desired cost structure, optimization is completed, and the nuggets can be cut. Also, any part of the workpiece that is not to be used as nuggets can be cut in a way that is easy for either personnel or machinery to identify such trim portions of the workpiece as not being a nugget, so as to eliminate the likelihood that such trim portions will be mixed with good nuggets.

In the foregoing methodology for optimizing the location of nuggets on a workpiece, rather than moving the entire grid pattern as a unit, the reference points of individual nuggets could be moved, thereby for each such nugget investigated, determining its aspect ratio, shape conformance and weight, and other desired specifications, either sequentially or simultaneously. In this technique, the nuggets of the grid pattern can vary with respect to other nuggets in size, shape, aspect ratio, weight, etc.

While the preferred embodiments of the invention have been illustrated and described, it will be appreciated that various changes can be made therein without departing from the spirit and scope of the invention. In this regard, the steps of the methods described herein can be carried out in sequences other than specified. Also, one or more of the specified steps can be deleted or modified from that described herein. Also, other modifications can be made to the methods described herein.

The invention claimed is:

1. A method of automatically portioning a food product into one or more final pieces based on an adjustable two-dimensional reference shape plus at least one additional physical criteria for the one or more final pieces, comprising:
    (a) using a user-interface to select an adjustable two-dimensional reference shape into which a food product is to be portioned, the adjustable two-dimensional reference shape being defined by a plurality of specified discrete points located along an outline of the adjustable two-dimensional reference shape, wherein the outline of the adjustable two-dimensional reference shape is displayed on an output display;
    (b) optionally editing the adjustable two-dimensional reference shape by using the user-interface to move the outline of the adjustable two-dimensional reference shape as displayed on the output display, to result in a change of the shape of the adjustable two-dimensional reference shape as displayed on the output display of:
    (c) retaining data pertaining to the adjustable two-dimensional reference shape in computer memory;
    (d) selecting at least one additional physical criteria, in addition to the adjustable two-dimensional reference shape, used to portion the food product into one or more final pieces, said at least one additional physical criteria selected from the group consisting of: the weight of the final piece; the maximum weight of the final piece; the minimum weight of the final piece; the length of the final piece; the maximum length of the final piece; the minimum length of the final piece; the width of the final piece, the maximum width of the final piece; the minimum width of the final piece; the height of the final piece; the maximum height of the final piece, the minimum height of the final piece, the thickness of the final piece, the maximum thickness of the final piece; the minimum thickness of the final piece;
    (e) determining a cut path to portion the food product into one or more final pieces having the adjustable two-dimensional reference shape as retained in the computer memory and as optionally edited by the user and meeting the at least one additional selected physical criteria of the one or more final pieces; and
    (f) portioning the food product into one or more final pieces according to the determined cut path.

2. The method of claim 1, comprising changing the shape of the adjustable two-dimensional reference shape as shown on the output display by a technique selected from the group consisting of:
    (a) selecting one or more locations along the two-dimensional outline of the adjustable two-dimensional reference shape and using the user-interface system to move the one or more selected locations to a new location shown on the output display, thereby to edit the shape of the adjustable two-dimensional reference shape as shown on the output display; and
    (b) selecting one or more of locations along the outline of the adjustable two-dimensional reference shape as shown on the output display and using the user-interface to specify new locations for said one or more selected locations along the outline of the adjustable two-dimensional reference shape, thereby to edit the shape of the adjustable two-dimensional reference shape shown on the output display.

3. The method of claim 1, wherein the user-interface system comprises a scanner system, and step (a) comprises scanning in the adjustable two-dimensional reference shape using the scanner system.

4. The method of claim 3, wherein the adjustable two-dimensional reference shape is formed of a food product or food product simulation material that has been cut or formed into the reference shape.

5. The method of claim 1, wherein the user using the user-interface system selects the adjustable two-dimensional reference shape from a library of reference shapes.

6. The method of claim 1, wherein the user-interface system is configured to allow a user to draw an outline of the adjustable two-dimensional reference shape.

7. The method of claim 1, wherein the user-interface system is configured to allow a user to enter the X and Y coordinate locations along an outline of the adjustable two-dimensional reference shape in X-Y space.

8. The method of claim 1, wherein step (e) of determining a cut path comprises scaling up or down the size of the adjustable two-dimensional reference shape on a food product while maintaining the shape of the adjustable two-dimensional reference shape until a predetermined weight or weight range for the portioned food product is achieved.

9. A system for automatically portioning a food product into one or more final pieces based on an adjustable two-dimensional reference shape and at least one additional physical criteria of the one or more final pieces, comprising:
a cutter for portioning the food product; and
a processor coupled to the cutter, the processor operatingly connected to a memory and a user interface system, and controlled by computer-executable instructions for performing the steps of:
(a) a user using the user interface system, entering an adjustable two-dimensional reference shape into which a food product is to be portioned,
(b) a user optionally editing the adjustable two-dimensional reference shape by manipulating an outline of the adjustable two-dimensional reference shape as displayed on the user-interface system, the user using the user-interface system to alter the outline of the adjustable two-dimensional reference shape thereby to change the shape of the adjustable two-dimensional reference shape, while shown on the user interface system,
(c) recording the user entered and optionally user edited, the adjustable two-dimensional reference shape in the memory;
(d) selecting at least one additional physical criteria for the one or more final pieces in addition to the adjustable two-dimensional reference shape used to portion the food product into one or more final pieces selected from the group consisting of: the weight of the final piece; the maximum weight of the final piece; the minimum weight of the final piece; the length of the final piece; the maximum length of the final piece; the minimum length of the final piece; the width of the final piece, the maximum width of the final piece; the minimum width of the final piece; the height of the final piece; the maximum height of the final piece, the minimum height of the final piece, the thickness of the final piece, the maximum thickness of the final piece; the minimum thickness of the final piece;
(e) determining a cut path to portion the food product into one or more final pieces having the adjustable two-dimensional reference shape as recorded in the memory and as optionally edited by the user and meeting the at least one additional selected physical criteria of the one or more final pieces in addition to the adjustable two-dimensional reference shape used to portion the food product; and
(f) controlling the cutter to portion the food product according to the determined cut path.

10. The system of claim 9, permitting the user to alter the adjustable two-dimensional reference shape, as shown on the output display, by a technique selected from the group consisting of:
(a) selecting one or more locations along the outline of the adjustable two-dimensional reference shape shown on the output display and using the user-interface system to move the one or more specified locations along the outline to a new location shown on the output display, thereby to edit the shape of the adjustable two-dimensional reference shape; and
(b) selecting one or more locations along the outline of the adjustable two-dimensional reference shape shown on the output display and using the user-interface system to specify new locations for said one or more selected locations thereby to edit the shape of the adjustable two-dimensional reference shape while shown on the output display.

11. The system of claim 9, wherein the user-interface system comprises a scanner system, and step (a) comprises scanning in an adjustable two-dimensional reference shape using the scanner system.

12. The system of claim 9, wherein the user using the user-interface system selects an adjustable two-dimensional reference shape from a library of reference shapes.

13. The system of claim 9, wherein the user-interface device is configured to allow a user to draw an outline of the adjustable two-dimensional reference shape.

14. The system of claim 9, wherein the user-interface device is configured to allow a user to enter the X and Y coordinate locations along the outline of the adjustable two-dimensional reference shape in X-Y space.

15. The system of claim 9, further comprising scaling up or down the size of the adjustable two-dimensional reference shape on a food product while maintaining the shape of the adjustable two-dimensional reference shape until a predetermined weight or weight range for the portioned food product is achieved.

16. A non-transitory computer-readable medium including computer-executable instructions for portioning a food product into one or more final pieces based on an adjustable two-dimensional reference shape and at least one additional physical parameter of the one or more final pieces, said instructions which, when loaded onto a computer cause the computer to perform the steps comprising:
(a) a user using a user-interface system, entering an adjustable two-dimensional reference shape into which a food product is to be portioned;
(b) a user optionally editing the adjustable two-dimensional reference shape to change the shape of the two-dimensional reference shape while displayed on an output display;
(c) selecting at least one additional physical parameter of the one or more final pieces in addition to the adjustable two-dimensional reference shape used to portion a food product into one or more final pieces selected from the group consisting of: the weight of the final piece; the maximum weight of the final piece; the minimum weight of the final piece; the length of the final piece; the maximum length of the final piece; the minimum length of the final piece; the width of the final piece, the maximum width of the final piece; the minimum width of the final piece; the height of the final piece; the maximum height of the final piece, the minimum height of the final piece, the thickness of the final piece, the maximum thickness of the final piece; the minimum thickness of the final piece; and (d) determining a cut path to portion the food product into one or more pieces having the adjustable two-dimensional reference shape as optionally edited by the user and meeting the at least one additional selected physical parameter of the one or more final pieces.

17. The computer-readable medium according to claim 16, wherein permitting a user to optionally edit the adjustable two-dimensional reference shape by a technique selected from the group consisting of:

(a) selecting one or more locations along an outline of the adjustable two-dimensional reference shape shown on the output display and using the user-interface system to move the one or more specified locations to a new location on the output display, thereby to edit the shape of the adjustable two-dimensional reference shape; and (b) selecting one or more locations along the outline of the adjustable two-dimensional reference shape shown on the output display and using the user-interface system to specify new locations for the one or more selected locations thereby to edit the shape of the adjustable two-dimensional reference shape while shown on the output display.

18. The computer-readable medium of claim 16, wherein step (a) comprises scanning in the adjustable two-dimensional reference shape using a scanner system.

19. The computer-readable medium of claim 16, wherein the user using the user-interface system selects an adjustable two-dimensional reference shape from a library of reference shapes.

20. The computer-readable medium of claim 16, wherein step (a) comprises using the user-interface system to draw an outline of the adjustable two-dimensional reference shape.

21. The computer-readable medium of claim 16, wherein step (a) comprises using the user-interface system, the X and Y coordinate values of locations along an outline of the adjustable two-dimensional reference shape in X-Y space.

22. The computer-readable medium of claim 16, wherein said instructions cause the computer to scale up or down the size of the adjustable two-dimensional reference shape on a food product while maintaining the shape of the adjustable two-dimensional reference shape until a predetermined weight or weight range for the portioned food product is achieved.

* * * * *